Sept. 3, 1940.  M. E. BENESH  2,213,378
HEATING UTENSIL
Filed Feb. 25, 1939   3 Sheets-Sheet 1

Inventor
Matthew E. Benesh
BY
Parker, Carlson, Pitzner & Hubbard
Attorneys.

Sept. 3, 1940.  M. E. BENESH  2,213,378
HEATING UTENSIL
Filed Feb. 25, 1939      3 Sheets-Sheet 2

Inventor
Matthew E. Benesh
BY
Parker, Carlson, Pitzner & Hubbard
Attorneys.

Inventor
Matthew E. Benesh
By
Parker, Carlson, Pitzner & Hubbard
Attorneys.

Patented Sept. 3, 1940

2,213,378

UNITED STATES PATENT OFFICE 2,213,378

HEATING UTENSIL

Matthew E. Benesh, Cicero, Ill.

Application February 25, 1939, Serial No. 258,419

12 Claims. (Cl. 53—1)

The present invention relates to heating utensils such as are commonly used on kitchen ranges, and has as its primary object the provision of a new and improved heating utensil of this type which is more efficient than similar utensils of prior constructions.

Another object is to provide a heating utensil with a novel bottom structure or heat economizer having good thermal conductivity and a large distributed heat absorption area for a comparatively small mass, and having a high resistance to corrosion.

A further object is to provide a heating utensil of the type disclosed in my copending application Serial No. 125,400, filed February 12, 1937 (Patent No. 2,172,952), having a bottom structure with novel heat absorption fins or vanes.

An important object is to provide novel fins or vanes of low cost construction which are highly resistant to corrosion, for example, in condensate forming corrosive atmospheres, which have a high coefficient of heat conductivity, and which afford a good thermal joint, as by welding, with the heat absorption surface of the utensil.

A more specific object is to provide a new and improved heat conducting fin which comprises a material, such as copper or aluminum, having a high coefficient of heat conductivity, and covered by a material such as stainless steel, having corrosion resisting properties and facilitating the formation of a joint, as by welding, to an iron bottom of a heating utensil.

Another object is to provide a heating utensil having a new and improved bottom structure including a covered material, such as copper or aluminum, having a high coefficient of heat conductivity, and arranged to effect the uniform spreading or distribution of heat ordinarily most highly concentrated at the center.

Other objects and advantages will become apparent as the description proceeds.

In the accompanying drawings, Figure 1 is a bottom view of a vessel embodying the features of my invention.

Fig. 2 is a fragmentary sectional view taken along line 2—2 of Fig. 1.

Figs. 3 and 4 are detail sectional views, on an enlarged scale, taken along lines 3—3 and 4—4 of Fig. 2.

Figure 14:
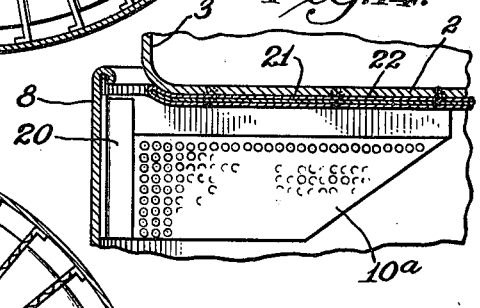
Figure 13:
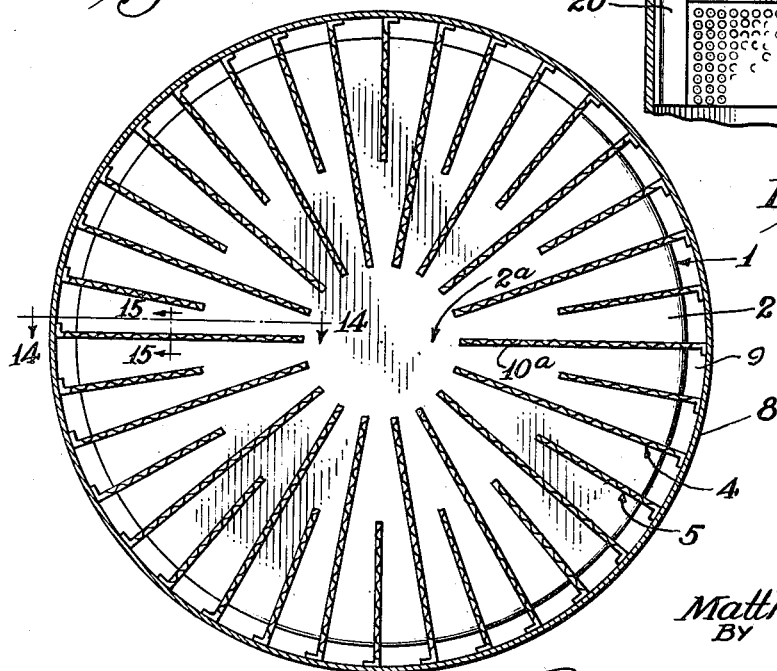
Fig. 13 is a bottom view of a heating utensil having another modified form of bottom structure.
Figure 15:
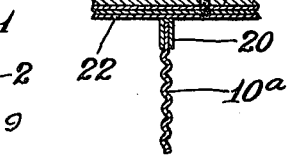

Figs. 14 and 15 are detail sectional views taken along lines 14—14 and 15—15 of Fig. 13.

Referring more particularly to the drawings, the invention is adapted for various kinds and types of heating utensils, such, for example, as kettles, teapots, coffeepots, pans and double boilers, etc., and for purposes of illustration is herein disclosed as embodied in a water warming kettle 1 having a bottom wall 2 and a peripheral or side wall 3.

One of the objects of the invention is to improve the heating efficiency of utensils of the foregoing character, and more particularly to utilize the available heat as fully as possible by increasing the heat absorption surfaces and the heat transfer coefficient of the heating elements. To this end, the utensil 1 is provided with a special bottom structure which is in good thermal contact with the wall 2 and which presents a large and distributed heat absorption area for a comparatively small mass. When positioned over a gaseous flame, the bottom structure also serves to insure more complete combustion of the fuel mixture before the products of combustion come in contact with the heating surface, and to prevent dilution of these products by an undesirable excess of secondary air, and the attendant drop in temperature that would result. Preferably, the bottom structure and the utensil 1 are integral to constitute a unit.

In one illustrative form, the bottom structure comprises a plurality of heat absorbing elements 4 and 5 distributed over the underside of the wall 2. These elements have a high coefficient of heat conductivity and consist of fins or vanes which are disposed laterally in perpendicular relation to the wall 2 and with their upper side edges in engagement therewith, and which are arranged to extend radially in uniformly peripherally spaced relation. It will be evident that the fins or vanes 4 and 5, being thin and exposed at both sides, present a very large heat absorption area supplementing the normal area of the wall 2.

The fins or vanes 4 and 5 are also utilized to effect a more uniform distribution of heat over the entire exposed surface of the bottom wall 2. Thus, the fins 4 and 5 do not extend over, but are arranged about, the central portion of the wall 2, as indicated at 2ª, where the heat from the source, such as a gas flame, is most intense, and are so shaped that the total heat absorption area increases progressively toward the periphery, where the temperature differences between the heating gases and the absorption surfaces being heated are less by reason of absorption and dilution. The ratio of the fin area to the unit area of the bottom of the vessel may be varied to obtain the best efficiency economically justified, and if desired may be increased outwardly. More particularly, the fins 4 and 5 extend to and preferably uniformly beyond the peripheral edge of the bottom wall 2, and are of various lengths, for example, long and short, and alternated. Also, the inner end edges 6 of the long fins 4, and the bottom side edges 7 of the short fins 5, are inclined upwardly and inwardly to the bottom wall 2.

The fins 4 and 5 not only provide a large distributed heat absorption area, but also define channel-shaped flow passages for the gaseous heating medium. Hot products of combustion impinging against the central portion of the bottom wall 2 are deflected outwardly, and caused to flow through the aforesaid passages in close contact with the sides of the fins 4 and 5. It will be evident that a large body of the gaseous heating medium is thereby maintained in direct contact with the heat absorption area, and that the flow is retarded by the friction and baffling effect set up by the fins 4 and 5, whereas in plane bottom utensils the heating medium passes quickly out of the heating zone and only a small body thereof ever comes in direct contact with the bottom wall.

Encircling the fins 4 and 5 and in good thermal contact with the outer ends thereof is a base ring 8. The upper marginal edge of the ring 8 projects above the fins 4 and 5 and the bottom wall 2 into spaced concentric overlapping relation with the side wall 3 of the utensil 1, and defines an annular outlet passage 9 for the gaseous heating medium. Since the ring 8 is in good thermal contact with the fins 4 and 5, it serves to increase the effective heat absorption area. It also restricts the upward flow of the gaseous medium, thereby increasing the time for heat transfer and directs the flow closely about the side wall 3 of the utensil 1 for further heat absorption.

Another function of the base ring 8 is to limit free intermingling of the surrounding atmosphere with the hot products of combustion until after the latter have passed from the heating surfaces. As a result, these products are not diluted and cooled by an undesired excess of secondary air.

Preferably, the lower marginal edge of the base ring 8 projects below the fins 4 and 5 to provide a larger combustion space, so that combustion will be practically complete before the products reach and are chilled by the heat absorption area.

The heat absorption elements, which herein comprise the fins 4 and 5, may be made of any suitable material, such as copper or aluminum, having a high coefficient of heat conductivity, and are secured in good thermal contact, as by welding, to the bottom wall 2 and the base ring 8. In inexpensive utensils, wherein the bottom wall 2 is made of iron, the welding of copper fins directly thereto is not practicably feasible. The present invention provides a novel method of and means for joining the good heat conducting fins 4 and 5 economically and efficiently to the iron wall 2 and iron ring 8. Thus, the copper strip 10 of each fin is positioned, at the marginal edge portions to be joined to the utensil 1, between two strips 11 and 12 of iron or steel, and the three strips are then welded together which is readily accomplished since the copper strip is enclosed from both sides. The iron-jacketed edges of the fin are then spot welded to the bottom wall 2. If desired, these edges may first be bent laterally to provide flanges 13 and 14 at the upper longitudinal margin and the outer end margin.

Copper is subject to corrosion at high temperatures and particularly in the presence of condensate forming corrosive conditions. To increase the life of the fins 4 and 5, the copper strips 10 may be entirely enclosed or jacketed by strips 11 and 12 of a corrosion resistance material, such as stainless steel.

Figure 1:
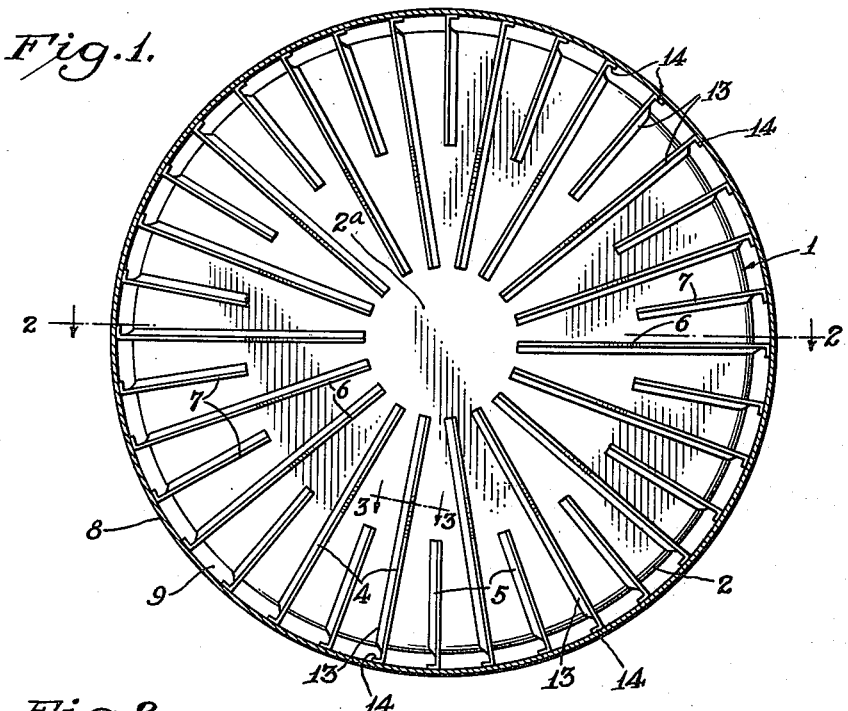
Figure 2:
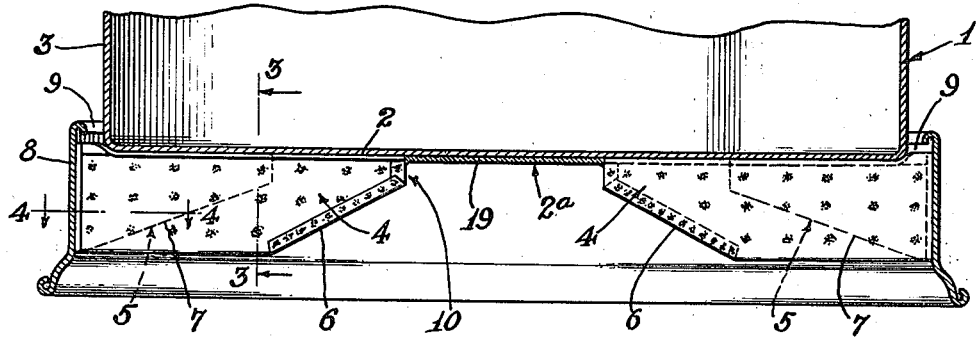
Figure 3:
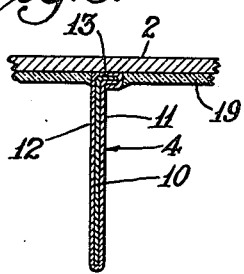
Figure 4:
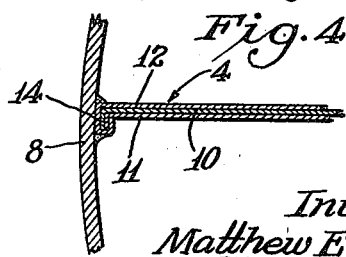
Figure 5:
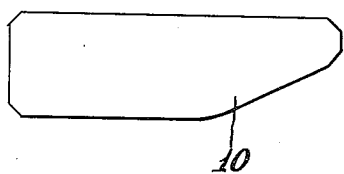
Figs. 5 to 11 illustrate successive steps in the manufacture of the fins.
Figure 6:
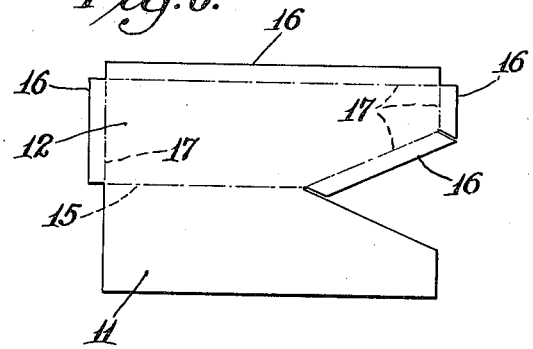
Figure 7:
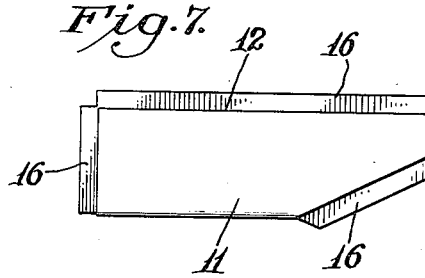
Figure 8:
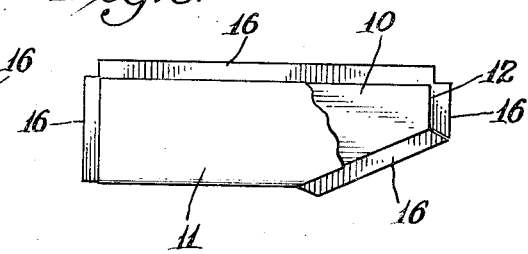
Figure 9:
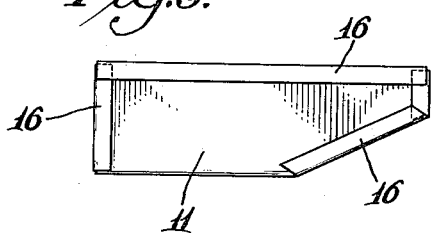
Figure 10:
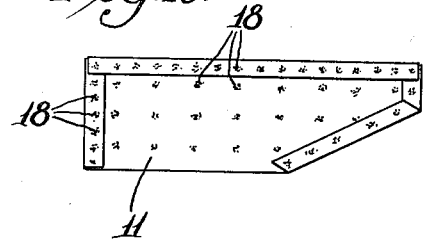
Figure 11:
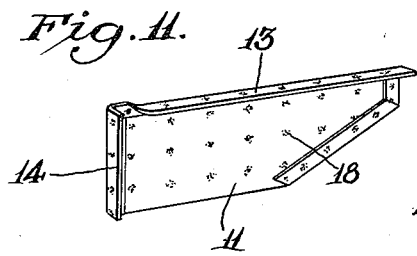

Figs. 5 to 11 illustrate the successive steps in making the fins 4. The conducting strip 10 is cut to the desired shape of the fin as illustrated in Fig. 5. A blank of stainless steel to form the jacket is cut in one piece as illustrated in Fig. 6, and is folded flat along a medial line 15 to form the strips 11 and 12 as illustrated in Fig. 7. The strip 11 is substantially coextensive in shape and size with the copper strip 10, and the strip 12 is the same with the exception that it has marginal extensions 16 along the free edges adapted to be bent or folded over along lines 17 to constitute seam flanges. The copper strip 10 is now inserted between the strips 11 and 12 as shown in Fig. 8, and the four edge flanges 16 are bent along the lines 17 over against the outer face of the strip 11 as shown in Fig. 9, thereby fully enclosing the copper strip 10. Thereupon, the inner and outer strips 10, 11 and 12 are fused together by closely spaced or running spot welds 18 along the seams and within the marginal confines as illustrated in Fig. 10, so as to seal the edges and obtain good thermal contact. Now, one longitudinal margin and one end margin of the stainless steel jacketed copper fin are bent at right angles to the body to form the mounting flanges 13 and 14 as shown in Fig. 11. As described, these flanges may be readily and satisfactorily secured with a good heat conducting juncture to the bottom wall 2 of the utensil 1.

The fins are economical to produce and to attach. They have a high coefficient of heat conductivity by reason of the enclosed copper and the good thermal contact established therewith. The stainless steel jacket protects the copper against corrosion, and affords means, capable of withstanding high welding temperatures, for obtaining a strong fusion joint between each fin and the utensil 1. At no time does the welding electrode touch the copper.

The protected fin construction permits porcelain enameling of the utensil when desired. The fins 4 and 5 are attached, and the utensil may then be enameled as indicated at 19. The enamel will adhere to the bottom wall 2 over all areas left exposed by the mounting flanges 13 and 14, and will not adhere to the fins 4 and 5 which, being corrosion resistant, have no need therefor.

The fins 4 and 5 serve to effect a more uniform distribution of heat over the bottom wall 2 of the utensil. Normally, the temperature head is the highest at the center portion of the wall 2. The copper strips 10, constituting a high heat conducting core, tend to spread the heat outwardly from the highly concentrated head, and in this the mounting flanges 13 and 14 afford material assistance since the enclosed copper therein in the aggregate flatly overlies an appreciable area of the wall 2.

Figure 12:
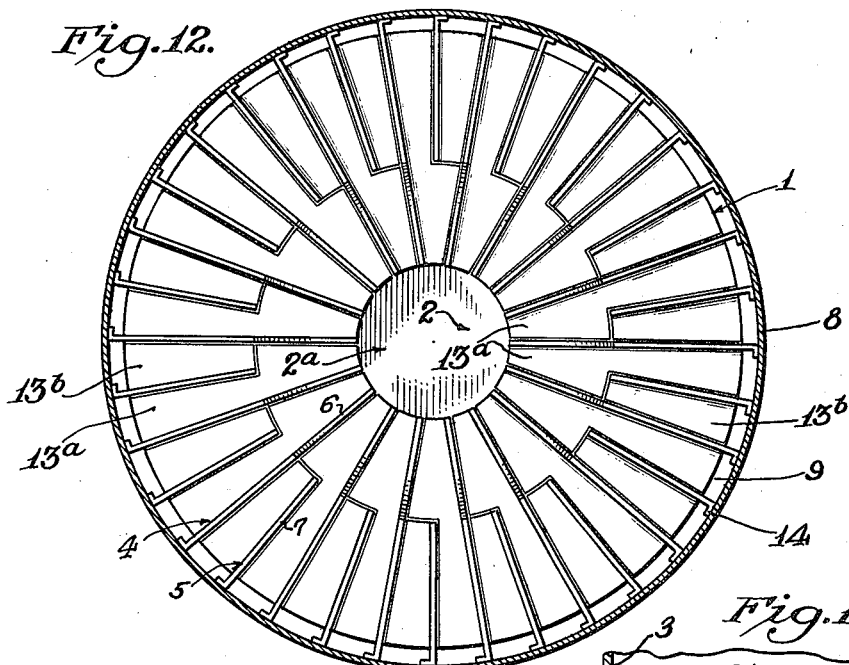
Fig. 12 is a bottom view of a heating utensil having a modified form of bottom structure.

The modified form of Fig. 12 is similar to that of Figs. 1 to 11 and corresponding parts of the two forms are therefore identified by the same reference numerals. The primary difference is that in the modified form, the long and short fins 4 and 5 are provided respectively with longitudinal mounting flanges 13a and 13b which are increased in area and suitably interfitted to overlie substantially the entire area of the base wall 2 between the fins. As a result, the base wall 2 is substantially covered by an enclosed layer of copper, thereby increasing the heat conductivity of the wall and effecting a more uniform spread of the temperature head. Since the wall 2 is substantially covered by the corrosion resistant fins 4 and 5 and their mounting flanges 13a and 13b, porcelain enameling, if otherwise desired as a protective coating, would not here be provided.

In certain instances, the fins 4 and 5 may not be fully protected against corrosion, but may each comprise a copper strip encased in iron or steel only at the mounting edges for the purpose of obtaining a fused or weld joint with the utensil. Such fins are shown for purposes of illustration in the modified form of Figs. 13 to 15. Each of these fins comprises a copper strip 10a. The marginal portions of the mounting edges of the strip 10a are enclosed and welded between folded border strips 20 of iron or stainless steel.

If desired, the bottom wall 2 may be covered by a heat spreading member to which the fins are secured. In Figs. 13 to 15, this member comprises a circular sheet 21 of copper enclosed in a jacket 22 of stainless steel spot welded to the wall 2 and substantially underlying the latter.

The fins 4 and 5 in any form of the invention may be attached in various ways. In the forms of Figs. 1 to 12, the fins preferably, but not necessarily, are provided with the mounting flanges 13 and 14, or 13a, 13b and 14 which are spot welded to the supporting surfaces and which have heat spreading functions. Since the copper sheet 21 in Figs. 13 to 15 serves as a means for spreading the temperature head, the fins 4 and 5 in this form are not provided with mounting flanges, and are butt or edge welded in position.

I claim as my invention:

1. In a heating utensil, in combination, a bottom iron wall, and a plurality of heat absorption fins secured to said bottom wall, each of said fins including a copper strip fully enclosed in and welded to a jacket of stainless steel, said strip and jacket assembly being bent laterally to define a mounting flange fitting against and welded to said wall.

2. In a heating utensil, in combination, a bottom iron wall, and a plurality of heat absorption fins secured to said bottom wall, each of said fins including a metal element having a high coefficient of heat conductivity and being fully enclosed within a jacket of iron, said strip and jacket assembly being bent laterally to define a mounting flange fitting against and joined to said wall.

3. In a heating utensil, in combination, a bottom iron wall, and a plurality of heat absorption fins secured to said bottom wall, each of said fins including a metal element having a high coefficient of heat conductivity and being fully enclosed within a jacket of iron, one edge of said jacket being fused to said wall.

4. In a heating utensil, in combination, a bottom wall, and a plurality of heat absorption fins secured to and projecting from said bottom wall, each of said fins including a strip of material having a high coefficient of heat conductivity and being fully enclosed by a jacket of a corrosion resistant material, said jacket being joined to said wall.

5. In a heating utensil, in combination, a bottom iron wall, and a plurality of heat absorbing and conducting fins secured in spaced relation to said wall, each of said fins including a copper strip and a folded strip of stainless steel enclosing one edge of said copper strip and welded thereto and butt welded to said wall.

6. In a heating utensil, in combination, a bottom wall, and a plurality of heat absorbing and conducting fins secured in spaced relation to said wall, each of said fins including a strip of material having a high coefficient of heat conductivity and a folded strip of corrosion resistant material secured to said first mentioned strip along one edge and joined to said wall, the major portion of said first mentioned strip being externally exposed.

7. A heat absorbing fin adapted to have a fused joint along one edge to the heat absorption surface of a heating utensil, said fin comprising a strip of copper, a blank of stainless steel folded along a medial line to engage and overlie opposite sides of said copper strip and having extension flanges folded over to enclose the edges of said copper strip, said blank being welded to said copper strip and said flanges being welded to said blank to seal the seams about said copper strip.

8. A heat absorbing fin adapted to have a fused joint along one edge to the heat absorption surface of a heating utensil, said fin comprising a strip of copper, a blank of stainless steel folded along a medial line to engage and overlie opposite sides of said copper strip and having extension flanges folded over to enclose the edges of said copper strip, said blank being welded to said copper strip and said flanges being welded to said blank to seal the seams about said copper strip, said one edge of said fin being bent laterally to form a mounting flange.

9. A heat absorbing fin adapted to have a fused joint along one edge to the heat absorption surface of a heating utensil, said fin comprising a strip of material having a high coefficient of heat conductivity, two strips of corrosion resistant material fully overlying opposite sides of said first mentioned strip and being integrally joined at the edges to enclose the edges of said first mentioned strip.

10. In a heating utensil, in combination, a bottom iron wall, a jacket of iron enclosing a sheet of material having a high coefficient of heat conductivity secured to said wall, and a plurality of heat absorption fins welded to said jacket.

11. In a heating utensil, in combination, a bottom iron wall having an internal sheet of copper, and a plurality of heat absorption fins secured to said bottom wall, each of said fins including a copper strip, and an iron strip welded to said copper strip and welded along one edge to said wall.

12. In a heating utensil, in combination, a bottom wall, and a plurality of heat absorption fins secured to said bottom wall, each of said fins including an inner strip of material having a high coefficient of heat conductivity, and two outer strips of metal overlying and welded respectively to opposite sides of said inner strip along one marginal edge, said superimposed strips being bent laterally along said edge to form a mounting flange secured to said wall, and said flanges of said fins being closely interfitted to cover substantially the entire area of said wall between said fins.

MATTHEW E. BENESH.